United States Patent [19]

Stephan

[11] 3,987,205

[45] Oct. 19, 1976

[54] UREA TREATED FISH EGG BAIT

[76] Inventor: John Thomas Stephan, 13 Mount Hood Lane, Longview, Wash. 98632

[22] Filed: Aug. 1, 1975

[21] Appl. No.: 601,133

[52] U.S. Cl. .................................................. 426/1
[51] Int. Cl.² ........................................ A23L 1/325
[58] Field of Search .................... 426/1; 260/117; 252/316; 424/36, 37

[56] References Cited
UNITED STATES PATENTS

| | | | |
|---|---|---|---|
| 1,358,985 | 11/1920 | Picht | 426/1 |
| 1,703,324 | 2/1929 | Sellen | 426/1 |
| 2,932,572 | 4/1960 | Sarich | 426/1 |
| 2,951,761 | 9/1960 | Stephan | 426/1 |

*Primary Examiner*—A. Louis Monacell
*Assistant Examiner*—R. A. Yoncoskie
*Attorney, Agent, or Firm*—Eugene D. Farley

[57] ABSTRACT

Fish eggs which have been rendered hard and opaque by protein coagulation are made into fish egg bait by reacting them with an aqueous solution of urea under conditions predetermined to swell and plasticize the eggs and render them translucent.

14 Claims, No Drawings

UREA TREATED FISH EGG BAIT

BACKGROUND OF THE INVENTION

This invention relates to fish egg baits. It pertains particularly to a process of making from fish eggs, particularly salmon eggs, improved bait eggs which more closely resemble natural fish eggs, with respect to their tactile and optical properties. In particular, the fish egg bait which is the product of the process of the present invention resembles natural fish eggs more closely than do the fish egg baits of the prior art with respect to plumpness, color, degree of translucency or transparency, and by being plastic or rubbery to the touch.

As is well known, salmon eggs are a natural food for trout, which coexist with the salmon in the spawning streams. For this reason salmon egg bait is a preferred bait for trout and has been available commercially for long period of time.

To be suitable for this use, the fish egg bait of commerce must fulfill several requirements which are difficult of fulfillment.

Thus the eggs should be plump and have a normal shape and appearance. Their consistency should be uniform and plastic. Their color should be appropriate. They should be large enough to make it possible to impale them successfully on a hook. They should be tough enough so that when so impaled they will remain on the hook and withstand the stresses of casting. Their taste and texture should not be distasteful to a biting fish.

Some of the prior art processes for the preparation of fish egg bait, for example that disclosed in my U.S. Pat. No. 2,951,761, have relied upon a combination brine, formaldehyde and heat treating process for toughening and preserving the eggs to make them suitable for use as bait. While the bait eggs produced by the prior art processes constitute a substantial article of commerce, they universally are hard and opaque and have a whitish color, in which important respects they are dissimilar to natural eggs. In an attempt to camouflage the eggs and overcome their unnatural color, it is conventional to dye the present day fish bait eggs with red dyes. However, this does not mask entirely the unnatural appearance of the bait.

It accordingly is the general purpose of the present invention to provide a fish egg bait and process for making the same, which bait is characterized by being translucent to transparent, rather than opaque; plastic or rubbery to the touch, as opposed to hard; and of a natural fish egg color, rather than white.

It is a further object of the present invention to provide a fish egg bait and process for making the same, which bait is plump and of relatively large size so that it may be impaled satisfactorily on a fish hook; which is tough so that when so impaled it will withstand casting; and which may be preserved effectively and consequently when marketed has long shelf life.

SUMMARY OF THE INVENTION

I have discovered that the foregoing and other objects of this invention may be accomplished by the provision of a process for making fish egg bait which comprises the following steps:

First, raw fish eggs, which normally occur in skeins preferably are singled.

Secondly, the skins of the singled eggs are toughened by treating the eggs with saline solution.

Third, optionally, the eggs with toughened skins are separated from the brine and stored under refrigeration until they are needed.

Fourth, the stored eggs, which may have become misshapen during storage, are plumped by treating with a further quantity of saline.

Fifth, the plumped eggs are hardened by treatment with a protein-coagulating agent such as aqueous formaldehyde and heat.

Sixth, the hardened eggs, which are opaque and white, are treated with an aqueous urea solution to render them translucent or transparent, and to plasticize the protein so that they become plastic or rubbery to the touch, rather than hard.

Seventh, the urea-treated eggs are, if desired, treated with dyes or preservatives as indicated or required.

The invention also comprehends the plasticized, translucent fish egg bait produced by the foregoing process.

DESCRIPTION OF SPECIFIC EMBODIMENTS OF THE INVENTION

The feed stock for the execution of the process of my invention comprises the eggs of fish usually taken commercially at various stages of egg development. The fish may be of any species, provided they possess roe of sufficient size to be suitable for use as fish bait.

Salmon roe comprise the feed stock of greatest potential importance since it is available in large quantities at commercial fish packing plants, particularly in the Pacific Northwest.

Typical fish species from which the eggs may be derived thus comprise the Chinook or King salmon, the Chum or Dog salmon, the Coho or Silver salmon, the Pink or Humpback salmon, the Sockeye salmon and the Atlantic salmon. However, eggs from other fish such as the halibut, sturgeon, cod or any variety of salt water or fresh water fish may be used.

Singling the Eggs

Because of the diversity of size, condition, and state of development of the eggs constituting commercial fish roe, in the hereindescribed process for making fish egg bait first it is preferred to process the roe to convert all of the eggs to the condition of single eggs, i.e. to "single" the eggs.

All fish eggs as they are obtained from the fish processing plant are surrounded by a gelatinous proteinaceous serum. When immature, they are bound together by membraneous materials into skeins.

To convert this heterogeneous mass of roe into single eggs, the more or less single eggs from the mature fish are combined with the egg skeins from the immature fish and the mass rubbed over nylon screens and washed. This effects the desired separation and produces a single egg stock suitable for use in the next step of the processing.

Skin Toughening

The next step in the process has for its purpose toughening the skin of the eggs to make them more durable and thus more suitable for the subsequent processing stages.

Fish eggs as obtained from the fish comprise a protective outer skin and proteinaceous fluid surrounded by the skin. The protective membrane ruptures rather readily, particularly in mature eggs, with the result that the eggs pop or squirt if they are pressed or punctured.

Since the processing steps to which the eggs are to be subjected involve mechanical handling of the eggs, it is desirable to toughen their skins so that they will not rupture.

To toughen their skins, the fish eggs are treated with saline solution, preferably a solution of sodium chloride or of calcium chloride. In effectuating the process the singled eggs are immersed in a concentrated brine which is from 50 to 100% saturated with the selected salt. Use of a saturated sodium chlorine brine at about ambient temperature is preferred. The eggs are left in the brine until their skins have been toughened. This requires from about 10 to about 30 minutes, preferably from about 15 to about 20 minutes.

After the skin-toughening step has been completed, the eggs are separated from the brine and stored substantially dry, i.e. with the occluded residual brine only. Under refrigeration at a temperature of from 33° to 45° F. they may be stored indefinitely in this form. If preferred, however, they may be stored in dilute brine, pending their requisition to meet plant schedules.

Plumping

The singled eggs which have been stored substantially dry and under refrigeration for a period of time tend to have non-spherical, distorted, flattened shapes due to compaction and storage. To convert them to satisfactory fish bait, it is necessary to restore them to their original approximately spherical shape prior to further processing.

This is accomplished by suspending the storage eggs in water or dilute saline solution having a concentration of from 0.1 to 100% saturated. Preferably, the brine employed has the same or approximately the same concentration as does that employed in the subsequent processing operations. The brine temperature should lie preferably about in the range of from just above the freezing temperature of the brine to about 150° F., ambient temperature.

The distorted eggs from storage are suspended in the brine for at least one hour, preferably about 24 hours, during which time they regain their original substantially spherical shape.

Hardening

As noted above, the liquid content of the fish eggs comprises primarily proteinaceous materials. Such proteinaceous materials are susceptible to gelation upon heating and/or upon treatment with various chemicals. Accordingly, in the instant process, advantage is taken of this property to convert the eggs having liquid centers to eggs having solid centers which can be impaled upon a fish hook and when once impaled will be retained there by the barb of the hook. A combination formaldehyde and heat treatment is employed for this purpose.

In carrying out the hardening step, the eggs are suspended in saline, particularly sodium chloride or calcium chloride brines. The brine is used in a concentration of from 0.1 to 100% saturated. Preferably, the brine employed is the same as that used for plumping the eggs, the plumping step being merely a preliminary operation preceding the hardening operation.

Formaldehyde in the desired amount for reaction is added to the brine and allowed to penetrate the eggs. The formaldehyde may be employed per se in the form of its aqueous solutions, or in the form of compounds which liberate formaldehyde under the conditions of treating the eggs. Such a compound is paraformaldehyde.

But a relatively small amount of formaldehyde is required, specifically from 0.2 to 0.7 pounds, and preferably from 0.3 to 0.6 pounds of formaldehyde, calculated as 100% formaldehyde, per 100 pounds of eggs.

The amount of formaldehyde required varies with the degree of plasticity and translucency desired in the egg products. It also varies with the variety of salmon eggs and their geographical origin, the presence of any preservatives or other addditives, the salt concentration, the treating time, etc. In general, the higher the salt concentration the less formaldehyde is required to achieve a given level of hardness. The longer the contact time between the egg and the formaldehyde solution at room temperature, the less formaldehyde is required in the solution to achieve a given level of hardness and plasticity in the finished egg products.

The temperature of treatment preferably is substantially room temperature, and the time is from 1 to about 48 hours.

During this preliminary treatment with formaldehyde, the formaldehyde uniformly hardens the skins of the eggs and assists in hardening the egg interiors. At the conclusion of the formaldehyde treatment, the eggs preferably are drained free of the formaldehyde-containing solution to terminate the absorption of formaldehyde by the eggs.

Cooking

The eggs which have been toughened and partially hardened by treatment with formaldehyde next are cooked to coagulate the protein further and render the eggs harder. The cooking also renders the eggs more susceptible to treating with urea, as will be described more fully hereinafter.

Although it is possible to cook the eggs in the formaldehyde brine in which they have been treated in the step immediately preceding, it is preferred not to do so because in this event the formaldehyde would continue to react with the substance of the eggs and make the quality of the product more difficult to control.

Accordingly, the eggs are drained free of the formaldehyde containing solution and are resuspended in a saline solution such as an aqueous solution of common salt, or calcium chloride, used in amount sufficient to provide a concentration of from 0.1% by weight salt to a fully saturated solution thereof.

The duration and severity of the cooking conditions are correlated with the severity and extent of the formaldehyde treatment, since these two process steps cooperate in rendering the eggs suitably susceptible to the subsequent urea treatment.

An oppropriate method of cooking the eggs is to suspend the eggs in the selected saline solution contained in a wooden barrel, using a sufficient amount of the saline solution to suspend the eggs freely and to promote heat transfer. The mixture then is heated by direct injection of steam of approximately 15 pounds gauge pressure until a cooking temperature of from 175° F. to the boiling point of the solution is reached. A preferred cooking temperature is from 190° to 205° F. In the alternative, the cooking may be carried out in a steam-heated jacketed vessel.

The time of cooking will depend largely upon the cooking temperature. At a cooking temperature of from 190° to 205° F., a cooking time of from about 10 minutes to about 90 minutes is indicated, the longer cooking time being applicable to the lower cooking temperatures and vice versa.

Other variables affecting the cooking temperature are the identity and source of the eggs, the severity of the preliminary formaldehyde treatment, and the concentration of the brine in which the eggs are suspended. The more dilute the brine, the longer the cooking time.

In a typical instance, when cooking fish roe suspended in a brine having a salt concentration of from 25% to 100% of the saturation value, the optimum cooking time at 200° F. will lie in the range of from 20 to 40 minutes.

The end point of the cooking operation is determined by physical examination. The operator samples the eggs from time to time as they cook, cools the samples in cold tap water or cold brine, and evaluates the degree of hardness. The eggs should be cooked to a degree of hardness greater than is desired in the eggs after they have been indurated in the urea solution, a condition which the operator will learn by experience.

After the cooking step has been completed, the cooked eggs are cooled by draining off the hot cooking liquor and placing the cooked eggs in cold water or cold brine only long enough to cool to room temperature. The eggs then are placed in brine, preferably of the same concentration as the cooking liquor. They then may be stored under refrigeration at temperatures of from 33° to 45° for months, pending completion of the processing.

At the conclusion of the formaldehyde and cooking treatments, the eggs are substantially in the condition of the commercially available fish bait eggs of the prior art. They are white in color, opaque and hard to the touch. They are quite dissimilar in these qualities to natural eggs and accordingly are less attractive to fish.

I now have discovered, and it is the essence of the present invention, that the tactile and optical properties of fish eggs treated in the manner described above may be improved so that they become soft and plastic to the touch and translucent or transparent in appearance while at the same time retaining their toughness so that they will remain on the hook when used as fish bait, and without acquiring a taste or other quality which is objectionable to the fish.

These desirable results are obtained by soaking the eggs in an aqueous solution of urea. Without commitment to any particular theory, it appears that urea possesses the unique ability of plasticizing or otherwise altering the heat- and chemical-hardened centers of the eggs, without deleteriously reducing the toughness of the skins.

As these changes in egg properties occur, there is a corresponding change in the egg composition in that a variable but measurable amount of urea passes through the membraneous skins of the eggs, no doubt by osmosis, and thereafter becomes permanent constituent of the egg centers. Within the eggs, it produces the above noted changes in tactile and optical properties of the eggs.

Treatment With Urea

In effectuating the treatment with urea, the eggs are suspended in a suitable saline solution, for example a solution of sodium chloride or calcium chloride which is from 0.1 saturated to saturated with respect to its salt content. Sufficient of the brine is used to secure a uniform suspension of the eggs.

Where cooking has been accomplished in water, or in a brine of low concentration, and the eggs thereafter stored in a brine of higher concentration, it is desirable for successful treatment with urea that the eggs in the new brine be permitted to stand a sufficient length of time to attain equilibrium in regard to brine content. This should be at least 24 hours and in some cases it may be as long as 10 days, the upper limit of time in most circumstances being non-critical. THe egs then are drained substantially free of brine and washed with water, if desired.

The drained eggs are placed in an aqueous urea solution used in amount sufficient to provide a urea-containing reaction medium containing from 10% urea by weight up to the amount required to saturate the solution with urea. At 78° F., for example, this will require 45.7% urea by weight.

The concentration of the urea is important in obtaining the desired alteration of egg properties. The higher the urea concentration, the more effective is its action in plasticizing the eggs and making them translucent and transparent. Urea solutions which are near the saturation point with respect to urea are best for producing transparency. A 10 or 20% by weight urea solution, however, will produce swollen, rubbery eggs which are mostly translucent with only a minor amount of transparent eggs.

The temperature of the urea treating solution also is important. In general, temperature ranging from the freezing point of the aqueous medium to about 150° F. are suitable, with room or ambient temperatures being preferred. At 70° F. an increase in translucency and swelling to at least 120% of the original egg volume, i.e. a "swelling ratio" of 1.2, is accomplished within about 2 hours of treatment. Additional swelling may take place and usually reaches a maximum within 24 hours, although in some cases swelling may continue for as much as 5 days and vary in amount over 200% of the original egg volume, e.g. a swelling ratio of 2.33.

The time of treatment with urea obviously is dependent upon the other variables, including urea concentration, temperature, egg source, and conditions of egg pretreatment. In a normal and convenient procedure, the eggs may be cooked and cooled in the morning, transferred to storage brine, allowed to attain equilibrium with the storage brine at room temperature over the afternoon, drained free of brine, washed and then treated with urea solution overnight.

The end point of the urea treatment is somewhat empirical in that the judgement and experience of the operator must be relied upon to determine when the optimum egg condition has been reached. When it has, the egg properties will be found to have been improved most surprisingly and beneficially.

Whereas the cooked, untreated eggs are hard, the urea treated eggs are plastic and rubbery.

Whereas the cooked untreated eggs are opaque, the urea treated eggs are translucent or even transparent, resembling natural eggs in this regard.

Whereas the cooked untreated eggs are white, the urea treated eggs have a more natural color tone. Whereas the cooked untreated eggs are of relatively small size, the urea treated eggs are swoolen to as much as double their volume.

In addition, the urea treated eggs are tough, cover the hook well, and stay on the hook tenaciously when used as fish bait.

To suit special applications or to meet special needs, the properties of the fish egg bait of my invention may be improved still further by dyeing them a selected color, or treating them with preservatives to increase their shelf life.

For this purpose, the conventional fish egg dyes may be employed such as Rhodamine, or Fast Red ALS. These dyes are soluble in aqueous urea solutions, and accordingly may be incorporated directly in the urea-containing reaction media.

Similarly, the urea treating solutions may be fortified with suitable bactericides or fungicides such as alkyl-dimethylbenzyl-ammonium chloride, or N-(lauroyl colaminoformyl-methyl) pyridinium chloride. When thus treated, the eggs will not readily develop mold when incubated at 120° F. for 2 weeks.

By combining the dye and the bactericide-fungicide in the urea, starting with the cooked eggs it is possible simultaneously to color the eggs, treat with preservative, enlarge the eggs, render them translucent, and render them plastic all in one step. The eggs then may be drained and packed in isotonic solution in hermetically sealed jars in the usual manner.

The residual urea solution may be reused in the treatment of subsequent batches of eggs, with fortification by the addition of urea, dye and preservatives as required.

EXAMPLES

The process of the invention and its novel fish egg bait product are illustrated by the following examples:

EXAMPLE 1

94 Pounds of King Solmon (*onchorynchus tsawytscha*) eggs obtained from Lake Michigan were treated with saturated sodium chloride brine for 18 minutes at substantially room temperature in order to toughen their skins. After such treatment the eggs had a pH of 6 as determined by mixing 10 grams of minced eggs with 10 ml. of distilled water and measuring the pH with a Beckman pH meter, using a glass electrode.

The brined eggs were drained free from most of the brine over a period of 60 minutes and then stored at 40° F. for 2 weeks.

The stored eggs were suspended in 30 gallons of 67% saturated sodium chloride brine and plumped for 1 hour at 68° F. 12 fluid ounces of 37% formalin then were mixed in, and the resulting mixture allowed to stand for another hour, still at room temperature of 68° F. The formaldehyde treated eggs then were cooked by injecting steam directly into the formaldehyde treating mixture for a period of 30 minutes during which time the temperature of the mixture was consistently over 200° F.

At the conclusion of the cooking cycle the brine was drained from the cooked eggs and cold 55° F. tap water added. The eggs thus were cooled to 70° F. and then transferred to 30 gallons of 67% saturated sodium chloride brine for overnight storage. The pH of the eggs still was 6.0.

The cooked eggs were opaque, white, and had hard centers. They were removed from the storage brine, washed with tap water to remove the surface brine, and then immersed at 68° F. for 16 hours in 250 pounds of urea solution containing 100 pounds of urea and 150 pounds of water. The eggs now were enlarged, transparent, and at a pH of 6.2. The average egg volume was 0.42 ml., indicating a swelling ratio of 1.31.

The eggs were translucent in that the size and shape of a fish hook could be distinguished when inserted into them. Tests showed that individual eggs hung well on a No. 8 hook and withstood casting. The egg consistency was uniformly plastic, or rubbery, providing considerable resistance to distortion when the eggs were pinched between the fingers. The egg color was very similar to the natural color of the salmon eggs and they made excellent bait. Sample eggs packed in 2 oz. glass jars and hermetically sealed were stable to storage and showed no change in characteristics when incubated at 120° F. for 2 weeks.

Example 2

The procedure of Example 1 was followed using as feed stock another 94 pound batch of salmon eggs. However, to the urea indurating solution there was added 3 oz. of a 10% by weight solution of alkyl-dimethyl-benzyl-ammonium chloride (a quaternary ammonium germicide), and 0.001 pound of Fast Red ALS dye. At the end of the 16 hour indurating period, the eggs were transparent and were colored a uniform shade of red. The average egg size had increased frm 0.32 ml. before treatment to 0.42 ml. after treatment.

Example 3

Single eggs taken from Dog or Chum Salmon (*Onchorynchus Keta*) caught in the vicinity of Petersburg, Alaska were treated at room temperature with saturated sodium chloride solution for 15 minutes, drained for approximately 1 hour and then refrigerated at 40° F. for 2 weeks before further processing. The pH of the eggs was 5.5.

In the following series of seven experiments, 20 gram samples of eggs from the refrigerated storage were placed individually in 50 ml. of 75%, 50%, or 25% saturated brine for 24 hours. Thereafter they were treated with selected amounts of formaldehyde used as a dilute 5.1% by weight formaldehyde solution and reacted for 16 hours. Thereafter the formaldehyde-containing brine was drained off and fresh brine of the same concentration added.

The reconstituted brine suspension of formaldehyde-treated eggs was cooked on an electric hot plate at selected temperatures for selected times. After cooking, the eggs were cooled rapidly to 65° F. and held in their respective brines for 24 hours. They then were treated with 40% by weight urea solution at substantially room temperature for various times up to 16 hours. The results were as follows:

TABLE 1

| Sample Number | Brine Concentration (saturated) | Grams 100% formaldehyde per 200 grams eggs | Cook cycle (° F.) | Average egg volume in ml. after urea treatment | | | | |
|---|---|---|---|---|---|---|---|---|
| | | | | At Start | AFTER | | | |
| | | | | | 1 hr. | 2 hr. | 4 hr. | 16 hr. |
| 1 | 75 | 0.122 | 10 min. at 160 | 0.30 | 0.32 | 0.28 | 0.30 | 0.30 |
| 2 | 75 | 0.0714 | 20 min. | 0.28 | 0.38 | 0.38 | 0.38 | 0.38 |

TABLE 1-continued

| | | | | | | | | |
|---|---|---|---|---|---|---|---|---|
| 3 | 75 | 0.122 | 20 min. at 180 | 0.28 | 0.34 | 0.36 | 0.36 | 0.32 |
| 4 | 75 | 0.122 | 30 min. at 180 | 0.32 | 0.44 | 0.44 | 0.46 | 0.44 |
| 5 | 50 | 0.122 | 20 min. at 200 | 0.28 | 0.32 | 0.30 | 0.34 | 0.34 |
| 6 | 50 | 0.122 | 30 min. at 180 | 0.34 | 0.38 | 0.38 | 0.40 | 0.42 |
| 7 | 25 | 0.122 | 20 min. at 180 | 0.32 | 0.32 | 0.32 | 0.32 | 0.32 |

| Sample Number | Remarks on eggs treated 16 hours | Swelling Ratio |
|---|---|---|
| 1 | Translucent, hangs on hook, weak runny gel. | 0 |
| 2 | Translucent, rubbery interior, tough skin, hangs well on hook. | 1.35 |
| 3 | Translucent, firm gel, hangs well on hook. | 1.14 |
| 4 | Transparent, rubber-like gel, hangs well on hook. | 1.37 |
| 5 | Translucent, weak rubbery gel, hangs well on hook. | 1.21 |
| 6 | Translucent, rubbery gel, hangs well on hook. | 1.23 |
| 7 | Translucent, weak rubbery gel, hangs well on hook. | 0 |

The egg products of all of the above runs were altered from an original white, opaque appearance to a translucent appearance and plastic texture. All of the eggs were of commercial bait quality. The egg pH had been altered slightly from an original level of pH 5.5 to a final level of pH 6.4.

The tabulated data show that translucent bait eggs of commerical quality may be made from Chum salmon eggs at salt concentrations ranging from 25 to 75% saturated, with formaldehyde usages varying between 0.356 pounds to 0.61 pounds of 100% formaldehyde per 100 pounds of egg, and cooking time variations of from 100 minutes at 160° F. to 30 minutes at 200° F.

Example 3

This example illustrates the effect of varying the concentration of the urea treating solution on the fish egg products of the invention.

94 pounds of King Salmon (*Onchorynchus tsawytscha*) eggs obtained from Lake Michigan were treated with 100% saturated sodium chloride brine for 18 minutes at room temperature. They then were drained free of brine, packed dry and stored in sealed plastic containers at 34° F. for 30 days.

The eggs then were immersed in 30 gallons of 62.1% saturated sodium chloride brine at 34° F. for 24 hours. Theraftar 0.785 pounds of 37° formalin (0.324 pounds of 100% formaldehyde) were added to the sodium chloride brine and the resulting mixture allowed to stand for an additional two hours at room temperature.

The mixture then was cooked for 30 minutes at a rolling boil with direct steam (15 psi) injection.

The eggs were cooled and stored in 62.1% saturated brine for 24 hours after which they were used as feed stock for a series of urea treatments using various concentrations of urea treating agents.

20 gram samples of the eggs were treated separately with urea solutions having concentrations varying from 0 to 40% urea by weight at substantially room temperature. Measurements of egg volume were made at the start of the urea treatment, after 2 hours immersion, and after 24 hours of immersion with the following results:

TABLE II

| Sample | % By Weight Urea in Treating Solution | Average Initial Volume of Egg | Average Volume of Egg After 2 Hours | Average Volume of Egg After 24 Hours | Swelling Ratio | Comments on 24 Hour Eggs |
|---|---|---|---|---|---|---|
| 1 | 40 | 0.32ml. | 0.40ml. | 0.42ml. | 1.31 | Transparent |
| 2 | 35 | 0.34 | 0.40 | 0.44 | 1.29 | Transparent |
| 3 | 30 | 0.32 | 0.42 | 0.44 | 1.37 | Transparent |
| 4 | 25 | 0.32 | 0.42 | 0.40 | 1.33 | Transparent |
| 5 | 20 | 0.30 | 0.40 | 0.38 | 1.26 | Translucent |
| 6 | 15 | 0.32 | 0.42 | 0.38 | 1.18 | Translucent |
| 7 | 10 | 0.30 | 0.40 | 0.36 | 1.20 | Translucent |
| 8 | 5 | 0.34 | 0.44 | 0.40 | 1.17 | Translucent |
| 9 | 0 | 0.32 | 0.42 | 0.38 | 1.18 | Opaque |

The foregoing results clearly illustrate that over the entire range of urea treating concentration the eggs successfully were converted from an opaque condition to a swollen, transparent or translucent condition.

Example 4

20 grams of King Salmon (*Onchorynchus tsawytscha*) eggs obtained from Lake Michigan were singled and treated with 100% saturated sodium chloride brine for 18 minutes. The eggs were drained from the major portion of the brine, and stored at 33° F. for 120 days. Thereafter they were suspended in 50 ml. of 75% saturated sodium chloride brine for 72 hours. They then were treated for 16 hours with 2.4 grams of a dilute formaldehyde solution made by diluting 11 grams of commercial 37% Formalin with 68.8 grams of water (i.e. 0.612 pounds of 100% formaldehyde per 100 pounds of eggs).

The eggs were removed from the formaldehyde-containing brine, resuspended in fresh 75% brine containing no formaldehyde, and cooked for 30 minutes at 201° F. They were cooled to 65° F. and held in 75% saturated brine for 24 hours.

Five individual eggs having an average volume per egg of 0.3 ml. were placed in 50 ml. urea solution having a concentration of 30 grams urea in 100 grams of solution. After 16 hours of immersion, the eggs were removed from the solution and surface-dried. Their average volume per egg as determined by displacement in the urea solution was found to be 0.4 ml. per egg, or a swelling ratio of 1.33.

The product eggs were translucent with tough skins and rubbery interiors. They were analyzed for urea content.

This was accomplished by washing the surface free of occluded solution, drying a ground and weighed sample of eggs for 72 hours at 160° F., taking up a 0.36 gram dried sample in 20 ml. of distilled water, and adding two drops of 0.1 N HCl and 0.1 gram of urease powder mixed and diluted with 50 ml. boiling water.

After 30 minutes the ammonia liberated by the ensuing reaction was titrated with 1 N sulfuric acid to a pH 4 end point. The urea equivalent to the liberated ammonia was calculated and found to be 45.8% by weight of the dried egg sample.

Example 5

In the following series of experiments King salmon eggs from the dry pack cold storage of Example 3 were plumped by immersing them in three separate lots in aqueous, calcium chloride brine having concentrations of 12½%, 20% and 30% by weight of anhydrous calcium chloride for 24 hours at room temperature (65° F.).

To individual 20 gram samples of eggs suspended in 50 ml. of the various brines were added 1, 2, 3 and 4 ml. of 5.1% formaldehyde solution. The resulting mixtures were allowed to stand at room temperature for 16 hours.

The eggs were separated from the formaldehyde-containing brine and placed in 50 ml. of freshly prepared calcium chloride brine of the same concentration as was used in the various formaldehyde treatments. They then were cooked at 201° F. for 30 minutes and cooled rapidly to 65° F.

After 24 hours at room temperature, five eggs were measured as to their average egg volume, washed free of surface brine, and immersed in 40% by weight aqueous urea solution. At 2 hours and 24 hours the average egg volume was determined. The pH of the solution after 24 hours swelling period was determined. The results are given in Table III.

TABLE III

| Sample | Calcium Chloride Brine Concentration | Ml. of 5.17 Formaldehyde Added | Average Egg Volume Initial | After 2 Hrs | After 24 Hrs |
|---|---|---|---|---|---|
| 1 | 12.5% | 1 | 0.24ml. | 0.34ml. | 0.44ml. |
| 2 | 12.5% | 2 | 0.28 | 0.38 | 0.48 |
| 3 | 12.5% | 3 | 0.32 | 0.42 | 0.52 |
| 4 | 12.5% | 4 | 0.30 | 0.38 | 0.48 |
| 5 | 20% | 1 | 0.26 | 0.40 | 0.52 |
| 6 | 20% | 2 | 0.32 | 0.44 | 0.54 |
| 7 | 20% | 3 | 0.24 | 0.40 | 0.48 |
| 8 | 20% | 4 | 0.32 | 0.46 | 0.54 |
| 9 | 30% | 1 | 0.24 | 0.44 | 0.56 |
| 10 | 30% | 2 | 0.26 | 0.44 | 0.54 |
| 11 | 30% | 3 | 0.32 | 0.50 | 0.62 |
| 12 | 30% | 4 | 0.28 | 0.46 | 0.56 |

| Sample | Solution pH at 24 hrs. | 24 hr. swelling ratio | Comments |
|---|---|---|---|
| 1 | 6.7 | 1.83 | Soft, weak rubbery gel, light tan, transparent. |
| 2 | 6.8 | 1.71 | Rubbery, transparent, light tan. |
| 3 | 6.9 | 1.62 | Transparent, light tan, some split. |
| 4 | 6.9 | 1.60 | Transparent, light tan, some split. |
| 5 | 6.4 | 2.00 | Soft, weak rubbery gel, light tan, transparent. |
| 6 | 6.5 | 1.69 | Transparent, light tan, tougher skin than No. 5. |
| 7 | 6.6 | 2.00 | Transparent, light tan. |
| 8 | 6.7 | 1.69 | Tough, rubbery gel, light tan, transparent. |
| 9 | 6.4 | 2.33 | Soft, light tan, transparent. |
| 10 | 6.5 | 2.07 | Rubbery, light tan, transparent. |
| 11 | 6.6 | 1.94 | Rubbery, light tan, transparent. |
| 12 | 6.6 | 2.00 | Translucent, light tan. |

Similar tests on similar eggs were carried out wherein the eggs were soaked in a urea solution made from 20 grams urea dissolved in 80 grams of water. The treated egg product had a urea content of 32.1% of the dried egg sample.

Similar tests on similar eggs which had been soaked in a urea solution made from 10 grams urea dissolved in 90 grams of water gave a urea analysis of 22.2% by weight of the dried egg sample. Control eggs which had not been soaked in any urea solution showed no measurable quantity of urea.

The above data demonstrate that calcium chloride brine may be employed in the execution of the process of the invention in place of sodium chloride brine. The principal difference resulting from the use of the two brines is that the calcium chloride brined eggs have a very light tan color whereas the sodium chloride brined eggs are more whitish.

Commercial quality transparent eggs were produced at swelling ratios of from 1.60 to 2.33 using calcium chloride brines with formaldehyde treatment varying from 1 to 4 ml. of 5.1% formaldehyde per 20 grams of eggs. The consistency of the calcium chloride treated eggs vary from a soft gel to a tough, rubbery jel. All of the calcium chloride brined eggs were of commercial quality, hung well on a fish hook and made excellent fish bait.

Calcium chloride is capable of forming brines of higher concentration than is sodium chloride and hence has a slight advantage in respect to producing eggs having a high degree of swelling.

Having thus described my invention in preferred embodiments, I claim:

1. The process of making fish egg bait which comprises:
   a. providing fish eggs, the protein of which is coagulated to a degree sufficient to render the eggs hard and opaque, and
   b. soaking the eggs in an aqueous solution of urea until the urea has penetrated into the interior of the eggs and the eggs have become swollen translucent and plasticized.

2. The process of claim 1 wherein the concentration of the aqueous solution of urea lies between 10% by weight urea and a saturated urea solution, and wherein the soaking temperature ranges between just above the freezing temperature of the urea solution and about 150° F.

3. The urea-containing, swollen, translucent and plasticized fish egg bait product of the process of claim 1.

4. The process of making fish egg bait which comprises:
   a. treating fish eggs in a saline solution with a hardening agent for protein until the eggs have become hard and opaque and
   b. soaking the hardened and opacified eggs in an aqueous urea solution until they have become plasticized, translucent, and swollen.

5. The process of claim 4 including the preliminary step of soaking the unhardened eggs in a saline solution comprising an aqueous solution of at least one salt of the class consisting of sodium chloride and calcium chloride, the saline solution having a salt concentration of from 0.1% saturated to fully saturated with respect to the selected salt, for a time sufficient to toughen the fish egg skins.

6. The process of claim 5 wherein the saline solution comprises a sodium chloride solution.

7. The process of claim 5 wherein the saline solution comprises a calcium chloride solution.

8. The process of claim 5 followed by the step of draining the saline solution from the eggs, storing the eggs under refrigeration for a desired storage period, and thereafter plumping the eggs preliminary to treatment with the protein-hardening agent by suspending them in a saline solution from 0.1% saturated to fully saturated with respect to salt, for a time sufficient to plump the eggs.

9. The process of claim 4 wherein the protein-hardening agent comprises formaldehyde used in the amount of from 0.2 to 0.7 pounds of formaldehyde per 100 pounds of eggs.

10. The process of claim 4 wherein the protein-hardening agent compriss formaldehyde used in the amount of from 0.2 to 0.7 pounds of formaldehyde per 100 pounds of eggs, the saline solution comprises an aqueous solution of sodium chloride having a concentration of from 0.1% saturated to fully saturated with respect to sodium chloride, and wherein the reaction is carried out at a temperature of from just above the freezing point of the mixture to about 150° F. for a time period of at least 1 hour.

11. The process of claim 9 including the step of cooking the formaldehyde-treated eggs in an aqueous urea solution at a temperature of from about 150° F. to about the boiling temperature of the solution, thereby further hardening the eggs.

12. The process of claim 4 wherein the urea solution contains from 10% by weight urea to sufficient urea to saturate the solution with respect thereto, and wherein the soaking temperature is from just above the freezing point of the urea solution to about 150° F.

13. The process of making fish egg bait which comprises:
   a. toughening the skins of fish eggs by soaking the eggs in brine having a salt concentration of from 0.1% to fully saturated with respect to salt, at a temperature of from just above the freezing temperature of the brine to 150° F. for a time sufficient to toughen the fish egg skins,
   b. hardening the eggs in the brine solution by reacting them with a formaldehyde protein coagulant used in amount of from 0.2 to 0.7 pounds of formaldehyde per 100 pounds eggs,
   c. cooking the formaldehyde-treated eggs in brine solution at a temperature of from 175° F. to the boiling point of the brine solution for a time sufficient to opacify the eggs and harden them further and
   d. treating the hardened and opacified eggs with aqueous urea solution having a urea concentration of from 10% saturated to saturated with respect to urea, at a temperature of from just above the freezing temperature of the urea solution up to about 150° F. for a time sufficient to plasticize and swell the eggs to render them substantially translucent and to permit migration of the urea into the egg centers, thereby forming a fish egg bait product characterized by a urea content.

14. The urea-containing, swollen, translucent and plasticized fish egg bait product of the process of claim 13.

* * * * *